United States Patent [19]
Takatori et al.

[11] 3,881,756
[45] May 6, 1975

[54] JOINTS FOR WELDING STEEL PIPE PILES

[75] Inventors: Ken Takatori, Kawasaki; Tetsuzo Hirose, Yokohama; Tsuyoshi Nakamata, Hiratsuka, all of Japan

[73] Assignee: Nippon Kokan Kabushiki Kaisha, Tokyo, Japan

[22] Filed: May 16, 1973

[21] Appl. No.: 360,913

[52] U.S. Cl. .............................................. 285/22
[51] Int. Cl. ............................................ F16l 13/02
[58] Field of Search .......................... 285/21, 22, 286

[56] References Cited
UNITED STATES PATENTS

| | | | |
|---|---|---|---|
| 1,679,702 | 8/1928 | Wysong | 285/21 |
| 1,962,350 | 6/1934 | Kane | 285/22 |
| 2,448,107 | 8/1948 | Mattimore et al. | 285/22 |
| 2,967,352 | 1/1961 | Weil | 285/286 |

*Primary Examiner*—Patrick D. Lawson
*Attorney, Agent, or Firm*—Flynn & Frishauf

[57] ABSTRACT

This invention relates to improved joints used for welding steel pipe pile pieces. The upper pile piece is provided with a short tubular joint metal having a diameter substantially the same with the inner diameter of the pile and which comprises a straight portion and a portion with a gradually decreasing diameter formed at the forward end of the straight portion, with the short tubular joint metal being secured on the inner wall of the upper pile piece at the joint end portion to partially project therefrom, whereby when the upper and lower pile pieces are joined together the upper piece is inserted into the lower piece with the curved portion of the reduced diameter portion of the joint metal acting as a guide. If there is a difference in diameter between the upper and lower pieces, the difference in pile diameter is corrected as the joint metal enters into the lower piece so that the straight portion of the joint metal eventually comes into close contact with the entire inner periphery of the lower pile piece, thereby placing the upper and lower pile pieces in good condition for welding.

10 Claims, 9 Drawing Figures

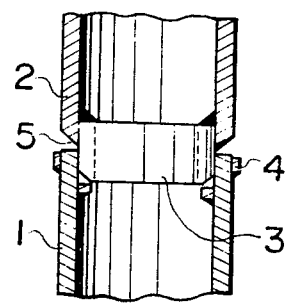
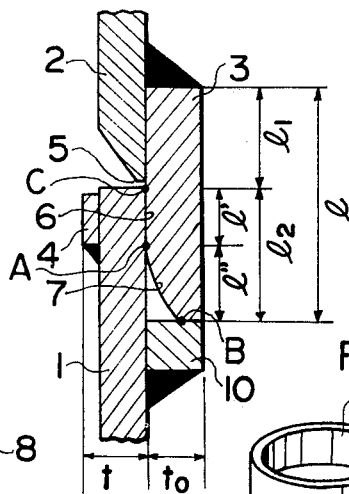
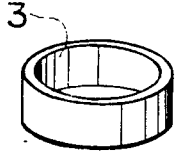
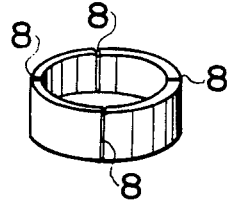
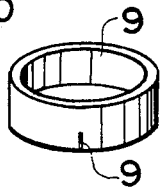
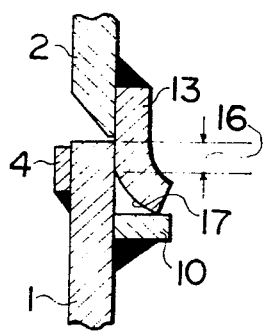
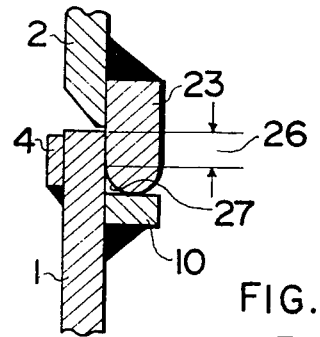
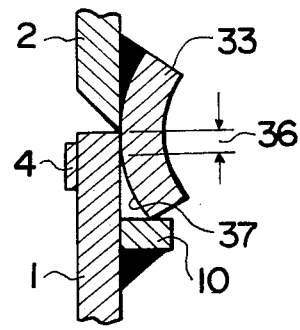
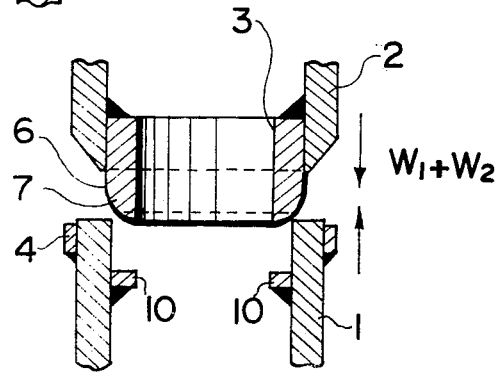

3,881,756

JOINTS FOR WELDING STEEL PIPE PILES

BACKGROUND OF THE INVENTION

At present, steel pipe piling is used for many structural purposes and the length of a single steel pipe piling is limited to a certain length from the manufacturing, transportation and storage points of view. Therefore, it is necessary to couple, in the field, different pieces of steel pipe pile together by welding the upper and lower pieces together at the joint thereof, thereby producing a solid pile.

In order that field welding of such a steel pipe pile may be effected, it is necessary to satisfy the following conditions to achieve the satisfactory joint for welding pile pieces together:

1. The use of an insertion guide for erecting and positioning the upper pile piece on the lower pile piece in the field. 2. The suitably beveled pipe end for the field welding. 3. The accomplishment of welding conditions necessary for attaining the desired strength at the welded joint. 4. The insurance of a satisfactory working efficiency.

To meet the condition (1), it has been the practice to utilize a guide piece or a projection of various shapes which is mounted on the upper end of a lower pile piece or on the lower end of an upper pile piece, thereby providing the necessary insertion guide.

On the other hand, there has been a tendency that when a lower pile piece has been driven into the ground, the out of roundness of the lower pile piece is not necessarily retained in good condition and in fact the roundness of the lower pile piece at the joint is deformed in a direction which is undesirable for good welding conditions. However, the conventional insertion guides of the type described above have no ability to correct the roundness of the upper and lower pile piece diameter and consequently it is very difficult to meet the welding conditions stated above in (3), no matter what types of grooves or bevels may be used.

It has also been the practice to use a rod, ring or plate as a backing member which is attached to the reverse side of the joint to meet the welding conditions stated in (3), particularly the welding conditions for semi-automatic welding. However, these backing materials have been unable to fully serve their purposes owing to the previously mentioned problem in the roundness of the pile pieces and this tendency has been particularly marked with the piles having large diameters.

SUMMARY OF THE INVENTION

It is therefore the principal object of the present invention to provide an improved joint structure for welding steel pipe piles which eliminates the above-mentioned drawbacks of the conventional joints for welding steel pipe piles and meets the essential requirements for steel pipe piling mentioned above in (1) to (4).

A unique feature of the improved joint structure according to the present invention resides, to attain the above-mentioned object, in the use of tubular joint metal pieces of various newly designed forms and shapes.

The above and other objects and features of the present invention will be readily apparent from the following detailed description when taken in conjunction with the accompanying drawings.

BRIEF DESCRIPTION OF THE DRAWING

FIG. 1 is a longitudinal sectional view of the joint between the upper and lower pile pieces according to an embodiment of the present invention;

FIG. 2 is a fractional enlarged section of a ring-shaped joint metal used with the present invention;

FIGS. 3 through 5 are perspective views showing modifications of the notch formed in the joint metal of FIG. 4;

FIGS. 6 through 8 are fractional sectional views showing respectively the manner in which upper and lower pile pieces are joined together with various modified joint metals of the present invention; and FIG. 9 is a view useful for explaining the load sustained at the joint of the upper and lower pile pieces.

DESCRIPTION OF THE PREFERRED EMBODIMENTS

In the accompanying drawings, numeral 1 designates a lower pile piece driven into the ground to a predetermined depth and 2 an upper pile piece to be joined on the upper end of the lower pile piece 1. Numeral 3 designates a joint metal piece which serves as a backing member and an insertion guide concurrently. Numeral 4 designates a face strap fit on the outer periphery of the lower pile piece 1 at the upper end thereof, and numeral 5 designates a bevel formed on the lower end of the upper pile piece 2.

Referring now to FIG. 2, there is illustrated a detailed view of the joint metal piece 3. The joint metal piece 3 is secured on the inner periphery of the upper pile piece 2 at the lower end thereof and it consists of a short tubular members having a diameter substantially the same with the inner diameter of the upper pile piece 2 with a portion of its forward end being extended downward by a length $l_2$ from the lower end portion of the upper pile piece 2. Of the extension $l_2$, a portion $l'$ extending from a point C corresponding to the lower end of the upper pile piece and a point A is formed into a straight-cylindrical portion 6 having a diameter equal to the inner diameter of the upper pile piece, while another portion $l''$ extending from the point A to a lower and B constitutes a reduced diameter portion 7 and in the illustrated embodiment the portion 7 is curved so that its outer diameter gradually decreases radially inwardly. It is to be noted that this reduced diameter portion may be formed into a tapered shape as will be explained later.

The extension $l_2$ should preferably have a dimension equal to or larger than that of portion $l_1$ secured onto the upper pile piece 2. It is also desirable that the portion $l''$ is equal to or larger in dimension than the portion $l'$. However, the total length $l$, and the lengths $l_1$, $l_2$, $l'$ and $l''$ of the joint metal piece 3 should be suitably selected to determine the optimum values in consideration of the pile diameter, the joint metal thickness, the piling or driving conditions, the soil conditions and so on. The thickness $t_o$ of the joint metal piece 3 is preferably greater than the pile thickness $t$. It is usually in the range between 9 and 16 mm. Numeral 10 designates a stopper member secured to the inner side of the lower pile piece 1 to receive the joint metal piece.

While the joint metal piece 3 may be formed as a perfect short tubular shape with no notch being made therein as shown in FIG. 3, it may be formed with notches 8 or 9 extending over the entire longitudinal length thereof or only in the curved reduced diameter portion 7 as shown in FIGS. 4 and 5. These latter forms can facilitate the insertion of the metal piece 3 into the lower pile piece.

FIGS. 6 to 8 show modified forms of the joint metal piece 3. FIG. 6 shows a joint metal piece 13 of a uniform thickness in which the lower part of a straight portion 16 is inwardly curved to form a curved reduced diameter portion 17. FIG. 7 shows a joint metal piece 23 in which the lower end portion of a straight portion 26 is formed into a semi-circular shape to provide a reduced diameter portion 27. FIG. 8 shows a joint metal piece 33 which consists of a metal piece circular in cross section and in which a curved reduced diameter portion 37 is formed at the lower part of a straight portion 36. In these modifications, the formation of the straight portions 16, 26 and 36 respectively, is essential.

If it is necessary to fit a reinforcing ring on the upper portion of the pile, the face strap 4 may be used as a reinforcing ring concurrently.

In the joint structure for welding steel pipe piles according to the present invention, a portion with a reduced diameter is formed at the foward end of a joint metal piece and this reduced diameter portion severs as a guide when an upper pile piece is inserted into a lower pile piece. Thus, the upper pile piece can be easily joined with the lower pile piece. Moreover, if there is any difference in diameter between the upper and lower pile pieces, as shown in FIG. 9, the inner edge portion of the lower pile piece abuts the reduced diameter portion of the joint metal piece. Therefore, by virtue of the weight $W_1$ of the upper pile piece and the weight $W_2$ of a hammer, the upper and lower pile pieces are joined together while smoothly adjusting the diameters of the upper and lower pile pieces. Further, when the upper and lower pile pieces are joined together, the straight portion 6 of the joint metal piece 3 comes into close contact with the whole inner periphery of the lower pile piece 1, thereby ensuring good welding conditions. Thus, any ordinary welder having no special skill can positively carry out the required field welding and hence the pile driving operation can be efficiently effected. As a result, the accuracy of roundness of steel pipe piles need not be so accurate as required for the conventional joint structures with the resultant reduction in the manufacturing cost of steel pipes and hence the reduction in the cost of constructing various structures.

What is claimed is:

1. A joint structure for steel pipe piles comprising:
a short tubular joint metal piece including:
a guide portion comprised of a reduced diameter portion formed on the lower periphery thereof, the diameter of said reduced diameter guide portion being gradually decreased radially; and
a straight-cylindrical portion formed on an upper periphery adjacent to said reduced diameter guide portion, the outer diameter of said straight-cylindrical portion being substantially equal to the inner diameter of a pile pipe to be joined;
an upper pile pipe, said joint metal piece being secured to the inner periphery of said upper pile pipe such that said straight-cylindrical portion and said reduced diameter portion of said joint metal piece project from a joint end of said upper pile pipe, said straight-cylindrical portion being adjacent said joint end of said upper pile pipe and said reduced diameter portion being remote from said joint end;
a lower pile pipe adapted to receive said upper pile pipe at a joint end thereof so as to be joined with said upper pile pipe by welding, said outer diameter of said straight-cylindrical portion being substantially equal to the inner diameter of said joint end of said lower pile pipe, said projecting portion of said joint metal piece being inserted into said joint end of said lower pile pipe with at least a portion of said straight-cylindrical portion inserted in said joint end of said lower pile pipe so as to join said upper and lower pile pipes together.

2. A joint structure for steel pipe piles according to claim 1, wherein the outer periphery of said reduced diameter portion of said joint metal piece is curved in the longitudinal direction of said joint metal piece.

3. A joint structure for steel pipe piles according to claim 1, wherein the outer periphery of said reduced diameter portion of said joint metal piece is tapered in the longitudinal direction of said joint metal piece.

4. A joint structure for steel pipe piles according to claim 1, wherein said joint metal piece has at least one longitudinal cut therein, said cut extending at least over a portion of the length of said joint metal piece.

5. A joint structure for steel pipe piles according to claim 1, wherein said joint metal piece has at least one longitudinal cut in at least a part of the length of said reduced diameter portion.

6. A joint structure for steel pipe piles according to claim 1, wherein said joint metal piece has at least one longitudinal cut extending throughout the whole periphery thereof, said cut being only partially through the thickness of the material of said joint metal piece at least over a portion of the periphery of said joint metal piece.

7. A joint structure for steel pipe piles according to claim 1, wherein said joint metal piece includes a second straight-cylindrical portion formed adjacent said first straight-cylindrical portion and on the side of said first straight-cylindrical portion which is opposite said reduced diameter portion, said second straight-cylindrical portion being inserted in and secured to the inner periphery of said upper pile pipe.

8. A joint structure for steel pipe piles according to claim 1, wherein said joint metal piece includes a second reduced diameter portion adjacent said straight-cylindrical portion and on the side of said straight-cylindrical portion opposite said first-mentioned reduced diameter portion, said second reduced diameter portion being inserted in and secured to the inner periphery of said upper pile pipe.

9. A joint structure for steel pipe piles according to claim 1, wherein said lower pile pipe includes a stopper member secured to the inner periphery thereof and against which said reduced diameter portion abuts when said inner diameter portion is inserted a given distance into said lower pile pipe.

10. A joint structure for steel pipe piles according to claim 1, wherein the combined longitudinal length of said reduced diameter portion and said first mentioned straight-cylindrical portion is equal to or greater than the longitudinal length of the portion secured to the inner periphery of said upper pile pipe, and wherein the longitudinal length of said reduced diameter portion is equal to or greater than the longitudinal length of said first-mentioned straight-cylindrical portion.

* * * * *